R. J. BARCUS.
Farm-Wagon.
No. 224,860. Patented Feb. 24, 1880.
Fig. 1.
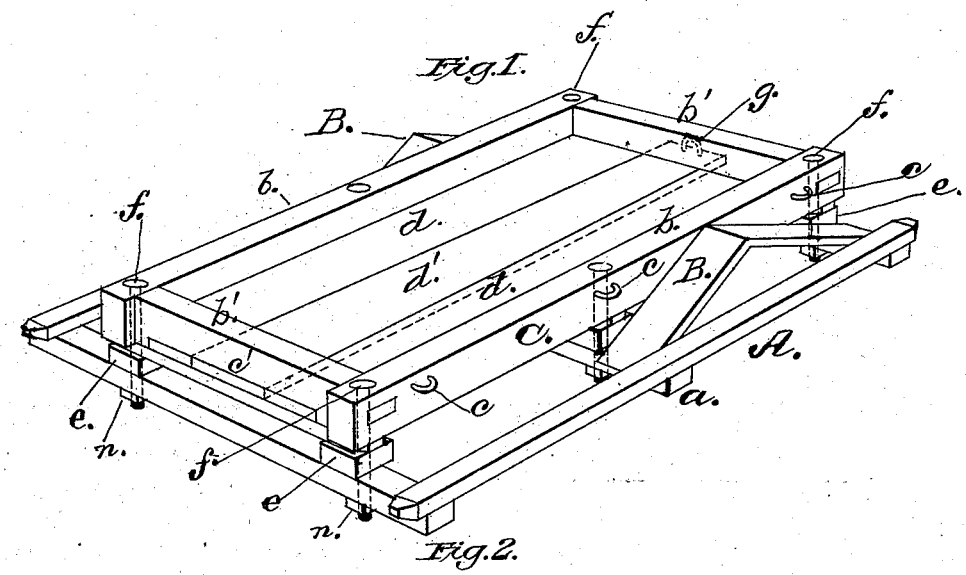
Fig. 2.
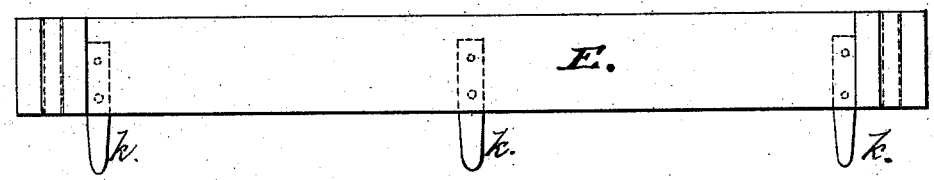
Fig. 3.
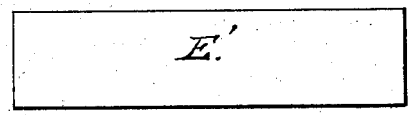
Fig. 4.
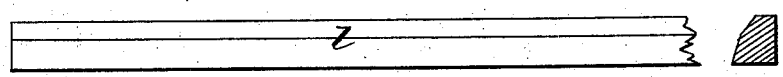
Fig. 6.    Fig. 5.    Fig. 7.
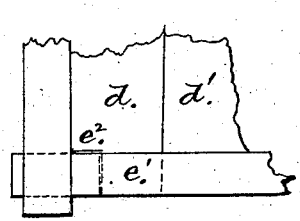  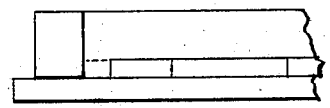
WITNESSES
John Akers
F. J. Masi
INVENTOR
R. J. Barcus,
by E. W. Anderson
his ATTORNEY

UNITED STATES PATENT OFFICE.

RICHARD J. BARCUS, OF MONROE, KENTUCKY.

FARM-WAGON.

SPECIFICATION forming part of Letters Patent No. 224,860, dated February 24, 1880.

Application filed August 4, 1879.

*To all whom it may concern:*

Be it known that I, RICHARD J. BARCUS, of Monroe, in the county of Hart and State of Kentucky, have invented a new and valuable Improvement in Wagons; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of the frame and bed; and Figs. 2, 3, 4, 5, 6, and 7 are details.

This invention has relation to improvements in combined wagon beds and frames.

The object of the invention is, mainly, to devise a wagon bed and frame combined, the parts of which are readily separable, and is thereby rendered convertible into a hay or straw rack, a box-body wagon, a rack or frame for hauling cord-wood or fence-rails, or other similar farm purposes or uses.

The nature of the invention will be fully set forth hereinafter.

In the annexed drawings, the letter A designates a strong rectangular frame, generally permanently secured to the running-gear of a four-wheel vehicle, extending out beyond the wheels, and provided with curved or angular guards B, that span the rear wheels thereof. This frame is composed of side rails and end bars braced by one or more cross-bars, $a$.

C indicates a second frame, like the frame A, also of rectangular form, and resting thereon between the guards B aforesaid. This frame C is made very strong, and its side bars, $b$, are provided with spaced staples $c$, the object of which will hereinafter appear, and its end bars, $b'$, with slots $c'$, of less length than said end bars, to receive the bottom boards, $d\ d'$.

Usually the frame C rests upon blocks $e$, interposed between it and frame A, and the former is secured to the latter by means of bolts $f$ extending downward through the angles of said frames and at the intersection of their cross-bars, the nuts applied upon the lower ends of said bolts, as shown in Fig. 1. These bottom boards, $d$, are passed endwise through the slots $c'$ and thrust outward from each other, and the rabbeted ends $e'$ extend through the said slots, while the shoulders $e^2$, formed by said rabbets, are received inside of said end rails, $b'$, and are thus prevented from endwise displacement.

The middle board, $d'$, is slightly wedge-shaped, and, being thrust between boards $d$, holds them against lateral movement, being itself locked against endwise movement by a pin, key, or other equivalent device, $g$.

As the device is exhibited in Fig. 1 it is admirably well adapted for transporting unthrashed grain, such as oats, wheat, rye, and hay or straw.

The side and end boards, E E', being applied to the frame C by means of the usual stakes $k$ and coupling-rods, converts the device into a wagon-body for conveying stone, earth, potatoes, and the like. These end and side boards being removed and the standards F inserted instead, rails, poles, and the like may be readily transported and cord-wood loaded up.

In transporting rails, poles, and cord-wood, the middle board, $d'$, of the bottom is removed by taking out the key $g$, and the side boards drawn out to avoid additional weight.

It being desired to haul barrels, hogsheads of tobacco, and the like, the standards are drawn out of the sockets, and two or more independent bars, $l$, are dropped between the side bars of the frame C, to serve as skids.

It will thus be seen that an ordinary hay-rack may be converted at small cost into a fruit or vegetable carrier in bulk, a pole or rail truck, a wood-wagon, and a barrel or hogshead transporter, and, in fact, adapted to any and all farm purposes.

What I claim as new, and desire to secure by Letters Patent, is—

In a vehicle for farm and other uses, the frame A, permanently secured to the running-gear, extending laterally beyond the wheels, and provided with guards B, extending over said wheels, the body-frame C, resting thereon between said guards, removably bolted to frame A, and provided with the removable bottom boards, $d\ d'$, and socket-staples $c$, the detachable side and end boards, E E', provided with stakes $k$, the standards F, and skids $l$, the whole combined, arranged, and operating substantially as specified.

In testimony that I claim the above I have hereunto subscribed my name in the presence of two witnesses.

RICHARD JOHN BARCUS.

Witnesses:
MARION McKINNEY,
CHARLES A. McKINNEY.